(12) United States Patent
Rui (10) Patent No.: US 11,182,051 B2
(45) Date of Patent: Nov. 23, 2021

(54) INSTANT COMMUNICATION MESSAGE PROMPTING METHOD AND INSTANT COMMUNICATION CLIENT

(71) Applicant: Alibaba Group Holding Limited, Grand Cayman (KY)

(72) Inventor: Kaidong Rui, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/534,800

(22) Filed: Aug. 7, 2019

(65) Prior Publication Data

US 2019/0361576 A1 Nov. 28, 2019

Related U.S. Application Data

(63) Continuation of application No. PCT/CN2018/074222, filed on Jan. 26, 2018.

(30) Foreign Application Priority Data

Feb. 8, 2017 (CN) .......................... 201710069356.4

(51) Int. Cl.
*H04L 12/58* (2006.01)
*G06F 3/0482* (2013.01)
(Continued)

(52) U.S. Cl.
CPC .......... *G06F 3/0482* (2013.01); *G06F 3/0484* (2013.01); *H04L 51/04* (2013.01); *H04L 65/403* (2013.01)

(58) Field of Classification Search
CPC ..... G06F 3/0484; G06F 3/0482; H04L 51/04; H04L 65/403
See application file for complete search history.

(56) References Cited

U.S. PATENT DOCUMENTS 8,027,442 B2  9/2011  Crandell et al.
8,077,849 B2  12/2011  Altberg et al.
(Continued)

FOREIGN PATENT DOCUMENTS

CN       1941708 A   4/2007
CN     101470729 A   7/2009
(Continued)

OTHER PUBLICATIONS

Chinese Search Report dated Mar. 16, 2019, for Chinese Patent Application 2017100693564, 3 pages.
(Continued)

*Primary Examiner* — Beau D Spratt
(74) *Attorney, Agent, or Firm* — Lee & Hayes, P.C.

(57) ABSTRACT

An instant communication message prompting method and an instant communication client are disclosed. In the method, in response to receiving an instant communication message, an instant communication client having a current interface as an audio/video call interface first determines whether the instant communication message satisfies a preset prompt condition. When the preset prompt condition is satisfied, prompt information is outputted in the audio/video call interface through a preset prompting mode. In other words, in the present disclosure, when receiving an instant communication message, an instant communication client whose current interface is an audio/video call interface prompts a user that a new instant communication message is received by outputting prompt information on the audio/video call interface, thereby enhancing the user experience.

19 Claims, 9 Drawing Sheets

(51) Int. Cl.
*G06F 3/0484* (2013.01)
*H04L 29/06* (2006.01)

(56) References Cited

U.S. PATENT DOCUMENTS

| | | | |
|---|---|---|---|
| 8,601,386 | B2 | 12/2013 | Altberg et al. |
| 9,043,407 | B1 | 5/2015 | Gaulke et al. |
| 9,294,522 | B1 | 3/2016 | Yeskel et al. |
| 9,319,523 | B2 | 4/2016 | Kirchhoff et al. |
| 9,602,986 | B2 | 3/2017 | Vendrow et al. |
| 9,736,089 | B2 | 8/2017 | Chen et al. |
| 9,772,985 | B2 | 9/2017 | Kahn et al. |
| 10,153,995 | B2 * | 12/2018 | Krishnamoorthy ..... H04L 67/02 |
| 10,554,599 | B2 * | 2/2020 | Weinig ................. H04L 51/066 |
| 2008/0262911 | A1 | 10/2008 | Altberg et al. |
| 2008/0263459 | A1 | 10/2008 | Altberg et al. |
| 2008/0263460 | A1 | 10/2008 | Altberg et al. |
| 2009/0013265 | A1 * | 1/2009 | Cole ...................... G06F 9/4408 715/758 |
| 2013/0066978 | A1 * | 3/2013 | Bentley ................ H04L 65/403 709/206 |
| 2014/0184723 | A1 | 7/2014 | Morrison et al. |
| 2014/0365914 | A1 * | 12/2014 | Peng ...................... G06F 16/957 715/752 |
| 2015/0278234 | A1 * | 10/2015 | Masterson .......... G06F 16/9577 715/234 |
| 2015/0350444 | A1 * | 12/2015 | Glass ....................... H04L 67/22 379/265.13 |
| 2016/0011883 | A1 | 1/2016 | Cole et al. |
| 2016/0050168 | A1 | 2/2016 | Zutphen |
| 2016/0063612 | A1 * | 3/2016 | Lopez ................ H04M 3/42178 455/414.1 |
| 2016/0259517 | A1 * | 9/2016 | Butcher ................ G06F 3/0488 |
| 2017/0046024 | A1 * | 2/2017 | Dascola .............. G06F 3/04845 |
| 2017/0230320 | A1 * | 8/2017 | Knight .................. H04L 65/601 |
| 2017/0237788 | A1 * | 8/2017 | Xi ....................... H04L 65/4038 709/204 |

FOREIGN PATENT DOCUMENTS

| | | |
|---|---|---|
| CN | 101742224 | 6/2010 |
| CN | 101867648 A | 10/2010 |
| CN | 102075337 A | 5/2011 |
| CN | 102868711 A | 1/2013 |
| CN | 103856386 A | 6/2014 |
| CN | 104063114 | 9/2014 |
| CN | 104469247 | 3/2015 |
| CN | 105577518 A | 5/2016 |
| CN | 105577653 A | 5/2016 |
| CN | 105578111 A | 5/2016 |

OTHER PUBLICATIONS

English translation First Chinese Office Action dated Mar. 27, 2019 for Chinese Patent Application No. 201710069356.4, a counterpart foreign application of U.S. Appl. No. 16/534,800, 16 pages.
English translated Chinese PCT Search Report dated Aug. 16, 2018 for Chinese PCT Application No. PCT/CN2018/074222, 2 pages.
English translation of the Chinese PCT Written Opinion dated Aug. 8, 2019 for Chinese Application No. PCT/CN2018/074222, 3 pages.
English translation Second Chinese Office Action dated Aug. 18, 2020 for Chinese Patent Application No. 201710069356.4, a counterpart foreign application of U.S. Appl. No. 16/534,800, 16 pages.
English translation Supplementary Chinese Search Report dated Jan. 12, 2021 for Chinese Patent Application No. 201710069356.4, a counterpart foreign application of U.S. Appl. No. 16/534,800, 1 page.

* cited by examiner

INSTANT COMMUNICATION MESSAGE PROMPTING METHOD AND INSTANT COMMUNICATION CLIENT

CROSS REFERENCE TO RELATED PATENT APPLICATIONS

This application claims priority to and is a continuation of PCT Patent Application No. PCT/CN2018/074222 filed on 26 Jan. 2018, and is related to and claims priority to Chinese Patent Application No. 201710069356.4, filed on 8 Feb. 2017, entitled "Instant Communication Message Prompting Method and Instant Communication Client," which are hereby incorporated by reference in their entirety.

TECHNICAL FIELD

The present disclosure relates to the field of computer technologies, and particularly to instant communication message prompting methods and instant communication clients.

BACKGROUND

In conventional technologies, an instant communication client in a state of audio and video calling directly displays message content of an instant communication message on a message interface when receiving the instant communication message. The message interface is used for displaying historical chat messages in a form of a list and unread messages. However, when a current interface of the instant communication client is an audio/video call interface, i.e., when the audio/video call interface is not reduced, a user cannot view the message interface, and thus cannot know that a new instant message is received, thus greatly affecting the user's experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure describes an instant communication message prompting method and an instant communication client, which can output prompt information to a user in time when receiving an instant communication message, thereby greatly improving the user experience.

In implementations, a method for prompting an instant communication message is provided, which includes: receiving, by an instant communication client, an instant communication message sent from an opposite instant communication client, a current interface of the instant communication client being an audio/video call interface; determining whether the received instant communication message satisfies a preset prompt condition; and outputting prompt information through a preset prompting mode on the audio/video call interface if the instant communication message satisfies the preset prompt condition.

In implementations, an instant communication client is provided, which includes: a receiving unit configured to receive an instant communication message sent from an opposite instant communication client, a current interface of the instant communication client being an audio/video call interface; a determination unit configured to determine whether the instant communication message received by the receiving unit meets a preset prompt condition; and an output unit configured to output prompt information in the audio/video call interface through a preset prompting mode when the determination unit determines that the instant communication message satisfies the preset prompt condition.

In the instant communication message prompting method and the instant communication client provided by the present disclosure, in response to receiving an instant communication message, an instant communication client having a current interface as an audio/video call interface first determines whether the instant communication message satisfies a preset prompt condition. When the preset prompt condition is satisfied, prompt information is outputted in the audio/video call interface through a preset prompting mode. In other words, in the present disclosure, when receiving an instant communication message, an instant communication client whose current interface is an audio/video call interface prompts a user that a new instant communication message is received by outputting prompt information on the audio/video call interface, thereby enhancing the user experience.

BRIEF DESCRIPTION OF THE DRAWINGS

In order to clearly illustrate technical solutions of the exemplary embodiments of the present disclosure in a better manner, drawings needed for describing the embodiments will be briefly described herein. Apparently, the described drawings merely represent some embodiments of the present disclosure. One of ordinary skill in the art can also obtain other drawings based on these drawings without making any creative effort.

DETAILED DESCRIPTION

The embodiments of the present disclosure will be described hereinafter with reference to the accompanying drawings.

Figure 1:
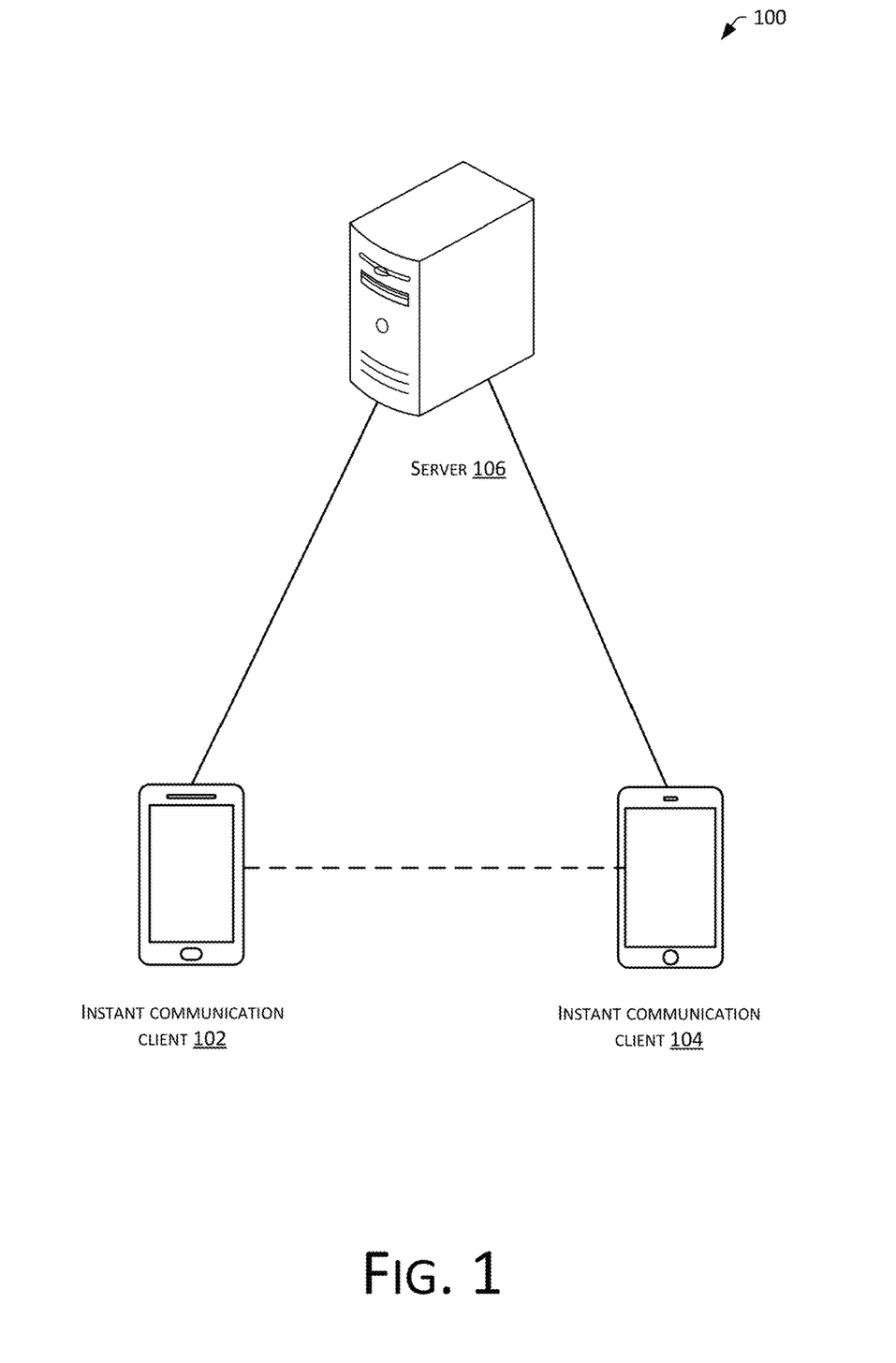
FIG. 1 is a schematic diagram of an application scenario of a method for prompting an instant communication message provided by the present disclosure.

A method for prompting an instant communication message provided by the present disclosure is applied to a scenario 100 as shown in FIG. 1. FIG. 1 includes two instant communication clients: an instant communication client 102 and an instant communication client 104. These two instant communication clients may refer to the following instant communication software clients: Ali Wangwang, Tencent QQ, WeChat, Laiwang, Yixin, Wangxin, etc., which may be located on a personal computer (PC) or located on the mobile terminal. It should be noted that the instant communication client 102 and the instant communication client 104 can establish an audio and video call connection. After the audio and video call connection is established, current interfaces of these two instant communication clients are audio/video call interfaces by default. Apparently, a user can also reduce a size of an audio/video call interface by clicking a size-reduction button to view other interfaces, such as a message interface. In the present specification, the user does not reduce the size of the audio/video call interface.

In FIG. 1, under the circumstance that the instant communication client 102 and the instant communication client 104 have established an audio and video call connection, if the instant communication client 102 sends a new instant communication message to the instant communication client 104, for example, a product link address, a red envelope or a text message, etc., the instant communication client 104 displays message content of the instant communication message in a message interface in the conventional technologies. Since the current interface of the instant communication client 104 is an audio/video call interface, a user thereof cannot see the message interface, and thus cannot know that a new instant communication message is received.

Figure 2:
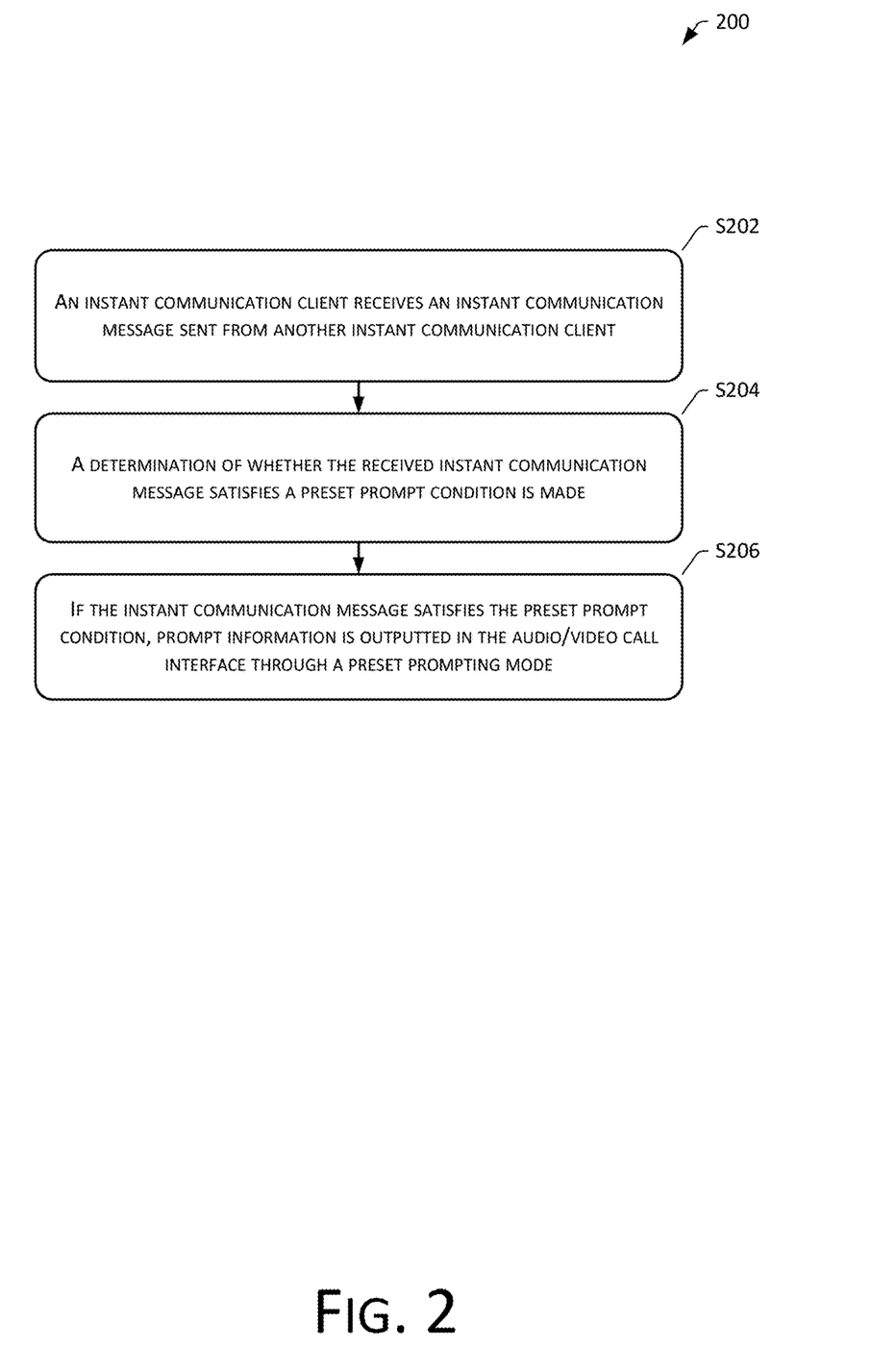
FIG. 2 is a flowchart of a method for prompting an instant communication message according to an embodiment of the present disclosure.

In order to enable a user of an instant communication client whose current interface is an audio/video call interface to know in time that a new instant communication message is received, the present disclosure will remind the user by outputting prompt information in the audio/video call interface. Details of an implementation process thereof can be referenced to FIG. 2. In FIG. 2, a method 200 may include the following operations.

S202: An instant communication client receives an instant communication message sent from another instant communication client.

Message content of the instant communication message herein includes, but is not limited to, a product link address, red envelope information, or text information, etc.

It should be noted that, when the instant communication client has not established an audio and video call connection with the other instant communication client, the instant communication client displays message content of the received instant communication message in a message interface after receiving the instant communication message. The interface is used for displaying historical chat messages and unread messages in a form of a list.

Figure 3:
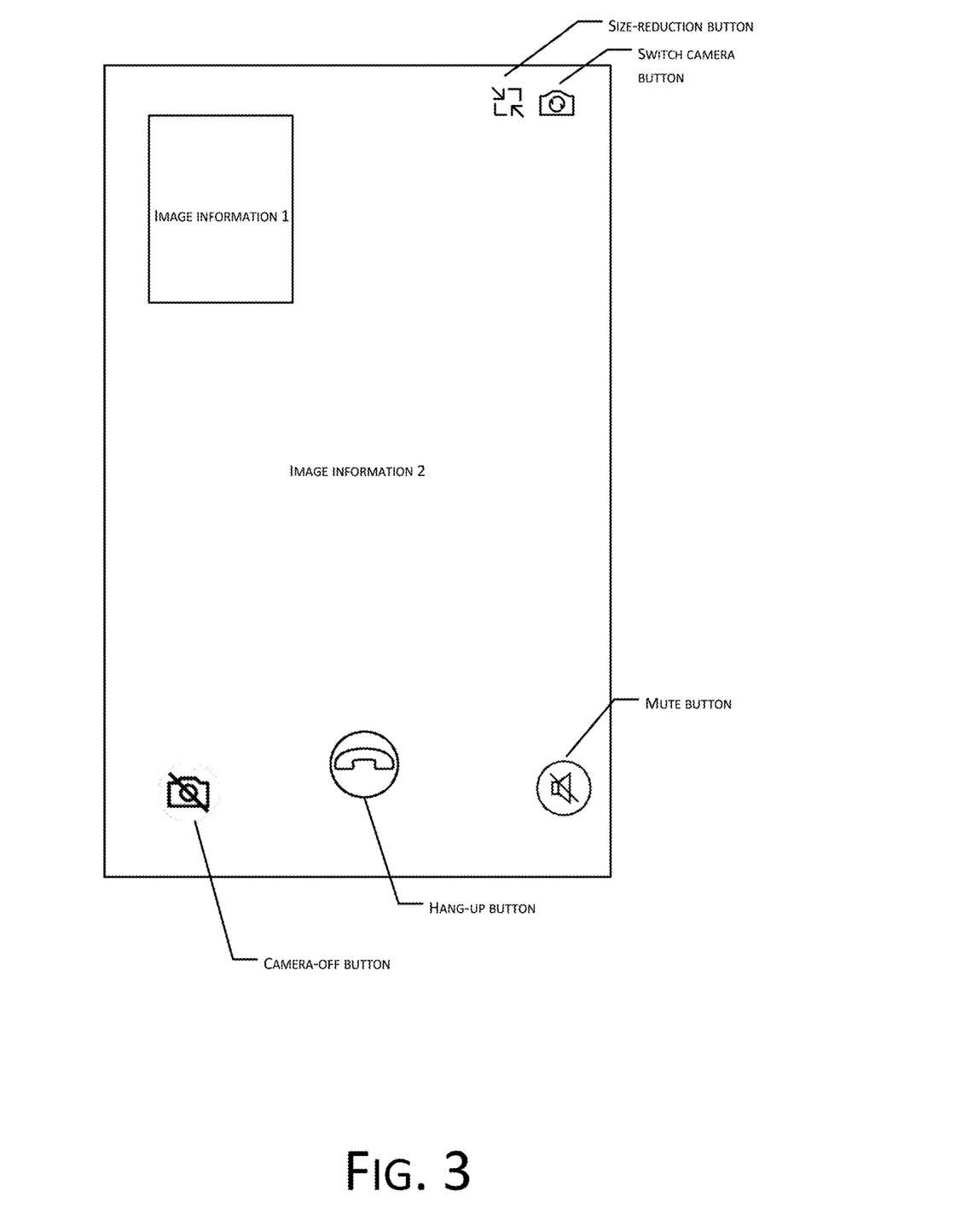
FIG. 3 is a schematic diagram of a video calling interface provided by the present disclosure.

When the instant communication client establishes an audio and video call connection with the other instant communication client, a current interface thereof is an audio/video call interface. An example with a client of Wangxin as an instant communication client having a video call connection being established is used. A video calling interface thereof may be the one as shown in FIG. 3. In FIG. 3, the video calling interface includes image information of a first user of the instant communication client, and image information of a second user of another instant communication client. In addition, operation buttons related to a current video call, such as a hang-up button, a mute button, a size-reduction button, a switch camera button, and a camera-off button, etc., are also included. In other words, under the circumstance that the current interface is an audio/video call interface, the user cannot view other interfaces of the instant communication client (e.g., a message interface, etc.), and thus cannot be aware of the instant communication message that is newly received.

S204: A determination of whether the received instant communication message satisfies a preset prompt condition is made.

The preset prompt condition may include whether the instant communication message is a message of a session to which the audio/video call interface belongs.

FIG. 1 is used as an example. The instant communication client 102 may establish a corresponding session before establishing an audio and video call connection with the instant communication client 104, and the session has a session identifier. After the session is established, the instant communication client 102 can record the session identifier of the session. It should be noted that a current interface of the instant communication client 102 is a session interface after the instant communication client 102 establishes a corresponding session with the instant communication client 104. It can be understood that an audio and video connection request can be sent to the instant communication client 104 through the corresponding session interface at the instant communication client 102.

After receiving the audio and video connection request, the instant communication client 104 can establish an audio and video call connection with the instant communication client 102. It can be understood that the audio/video call interface of the instant communication client 102 or the audio/video call interface of the instant communication client 104 belongs to the established session after the audio and video call connection is established.

In addition, after the audio and video call connection is established with the instant communication client 104, the instant communication client 102 can also send an instant communication message to the instant communication client 104 through the session interface, and the instant communication message carries the session identifier. After receiving the instant communication message, the instant communication client 104 determines whether the instant communication message belongs to the session to which the current audio/video call interface belongs according to the session identifier that is carried by the instant communication client 104, i.e., whether the preset prompt condition is satisfied.

Figure 4:
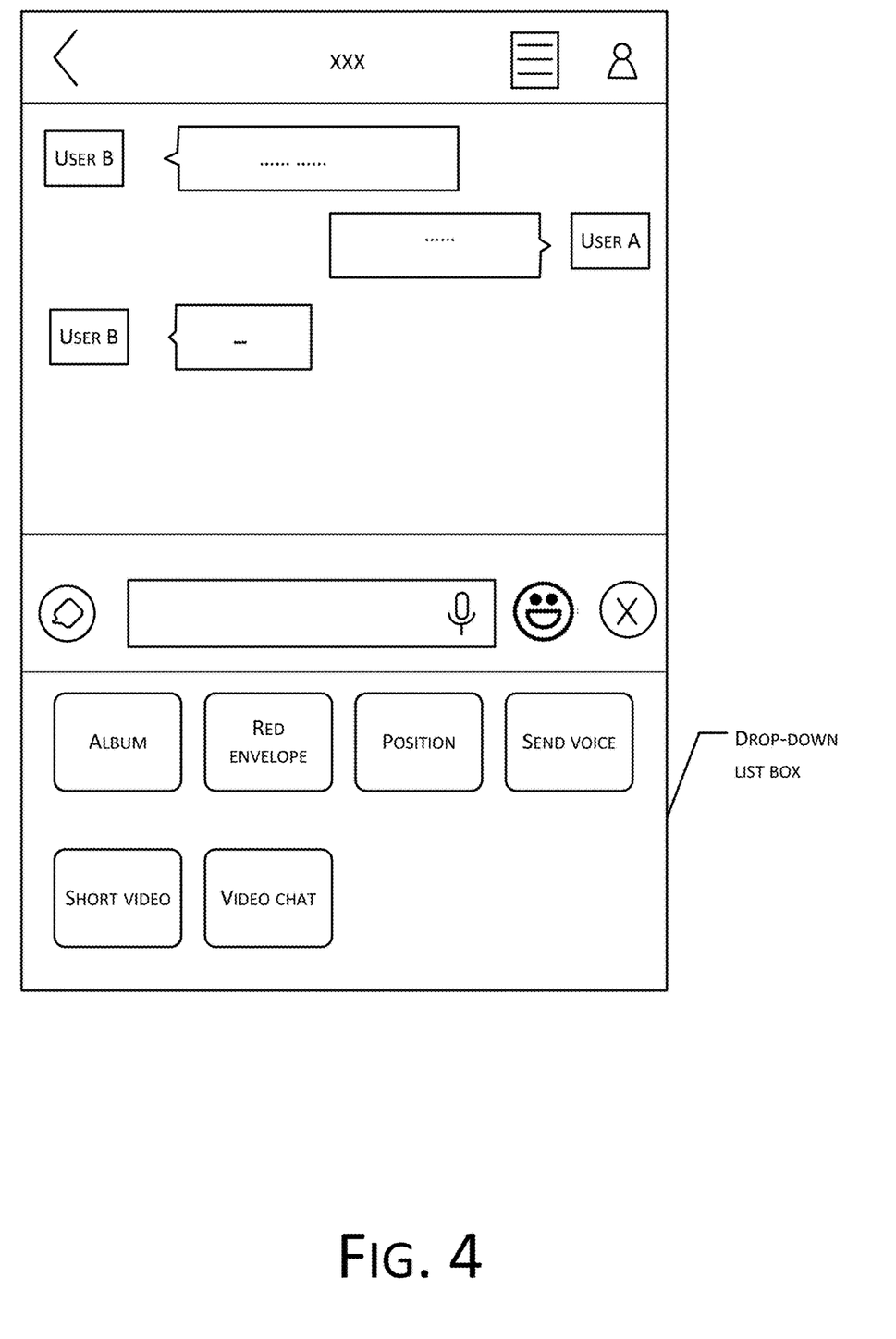
FIG. 4 is a schematic diagram of a session interface provided by the present disclosure.

For example, the instant communication client 102 and the instant communication client 104 are both assumed to be clients of a website. The user of the instant communication client 102 is user A, and the user of the instant communication client 104 is user B. For the instant communication client 102, the corresponding session interface can be the one as shown in FIG. 4. In FIG. 4, historical chat information between the user A and the user B, an input box, and a "⊕" button, etc., are included. Specifically, after the user clicks the "⊕" button, and clicks an icon corresponding to a video chat in a pop-up icon display box, a drop-down list box can be popped up. By selecting "Video Chat" in the pop-up drop-down list box, a video call request can be initiated and sent to the instant communication client 104, and a video call connection can be established. Switching from the interface as shown in FIG. 4 to the interface as shown in FIG. 3 can be performed thereafter.

In FIG. 3, when the user A clicks the size-reduction button, the session interface as shown in FIG. 4 can be viewed. On the session interface, the user A can send an instant communication message to the user B through an input box or an icon in the drop-down list.

Apparently, in a practical application, the preset prompt condition may also be set to other conditions, such as whether the instant communication message is a message of the session to which the audio/video call interface belongs, and whether the message content of the instant communication message is a target message (e.g., a product), etc., which is not limited by the present disclosure.

S206: If the instant communication message satisfies the preset prompt condition, prompt information is outputted in the audio/video call interface through a preset prompting mode.

The preset prompting mode may include a voice prompt, a vibration prompt, a display message prompt box (toast) prompt or a display information card prompt, etc. The information card may include content such as a picture, a text, a button control, and the like, and the information card may also be associated with a target page.

In the foregoing example, after receiving the instant communication message, the instant communication client 104 can determine whether the instant communication message belongs to the current session (i.e., the session to which the audio/video call interface belongs) by comparing the session identifier in the instant communication message with the session identifier of the session to which the current audio/video call interface belongs. If the preset prompting method is to display the information card prompt, the information card may be generated according to the message content of the instant communication message in response to determining that the instant communication message belongs to the current session, i.e., in response to determining that the instant communication message satisfies the preset prompt condition. The information card is associated with a target page, and the target page is used to display information related to the message content of the instant communication message, e.g., a product display page, a red envelope collection page, a blessing card page, etc.

For example, the message content of the instant communication message is a product link address (for example, a Uniform Resource Locator (URL) address). The process of generating an information card according to the message content of the instant communication message may include:

a. The instant communication client extracts identification information (also called a product identification) of a product from the product link address (in an implementation, the instant communication client can extract the product identification from the product link address through regular expression matching);

b. According to the identification information, detailed information of the product is obtained from a server 106, which may specifically obtain information of the product by invoking a product inquiry interface, and the detailed information may include information related to the product link address such as a product image of the product, a product title, and a product price;

c. An information card is generated based on the detailed information, and the information card can be associated with a product display page corresponding to the product link address.

After the information card is generated, the generated information card can be displayed on the audio/video call interface of the instant communication client. In an example, the information card can be a purely native rendering display provided using an android system. Displaying an information message card in a video calling interface is used as an example. As described above, the video calling interface displays the image information of the first user of the instant communication client and the image information of the second user of the other instant communication client. When the generated information card is displayed in the video calling interface that displays the image information of the first user and the image information of the second user, two situations exist. First, if a terminal where the instant communication client is located is a PC end, the image information of the second user and the generated information card can be displayed side by side because the screen on the PC side is relatively large. Second, if the terminal where the instant communication client is located is a mobile terminal, the information card can be displayed in a floating manner on the image information of the second user because the screen of the mobile terminal is relatively small. The floating method can be set by default or can be changed by self-definition, or can be adjusted according to the user's habits.

Figure 5:
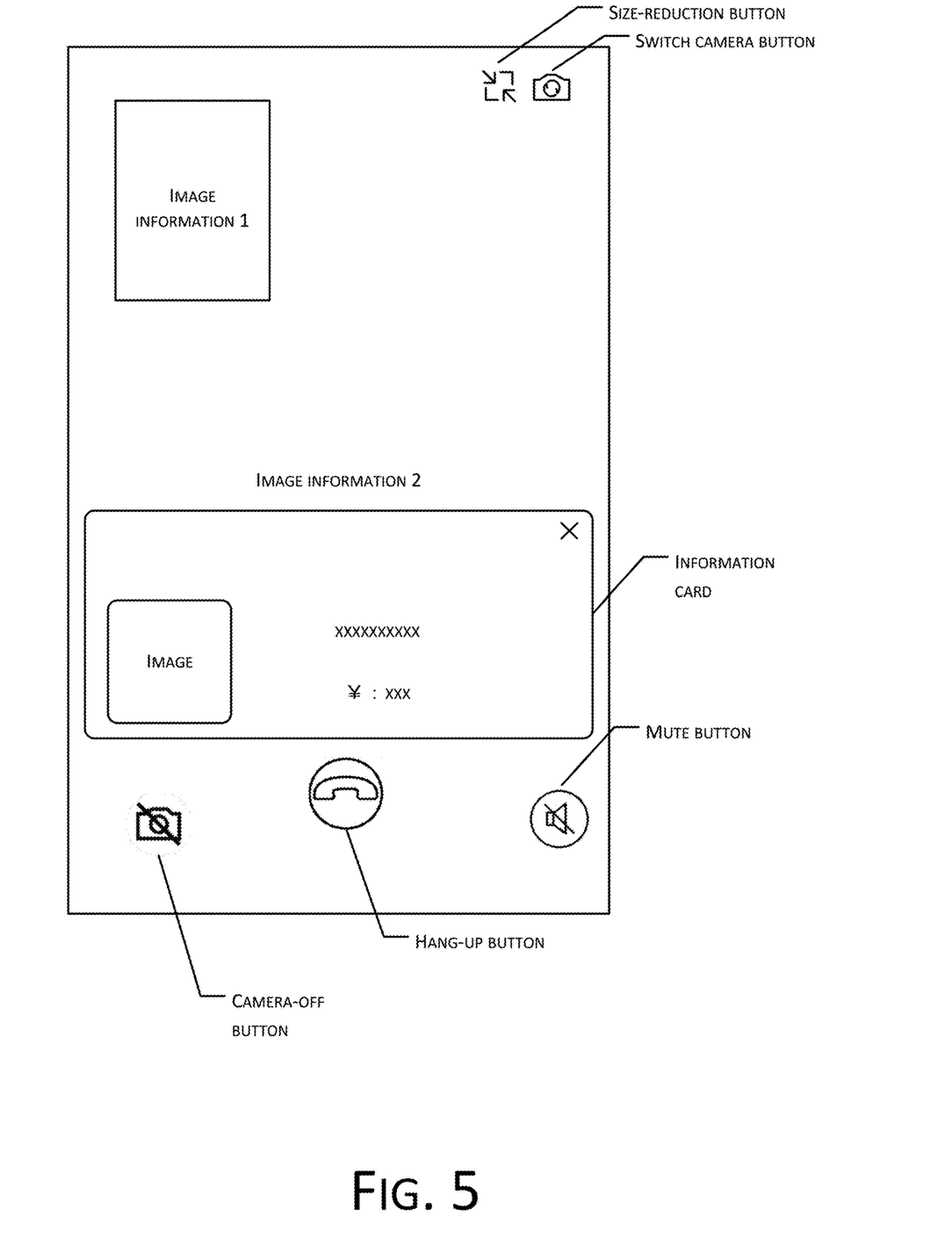
FIG. 5 is a first schematic diagram of an information card provided by the present disclosure.

In the foregoing example, the user A is assumed to send a product link address of a product XX to the user B through the instant communication client 102. The video calling interface of the instant communication client 104 of the user B can display the information card as shown in FIG. 5. In FIG. 5, the information card is displayed on the top of the image information 2 in a floating manner.

For the information card displayed on the image information of the second user, the instant communication client may receive an adjustment instruction for the information card inputted by the user, and adjust a size and/or a position of the information card according to the adjustment instruction. In addition, a closing instruction for the information card inputted by the user may also be received, and the information card is closed according to the closing instruction.

Figure 6:
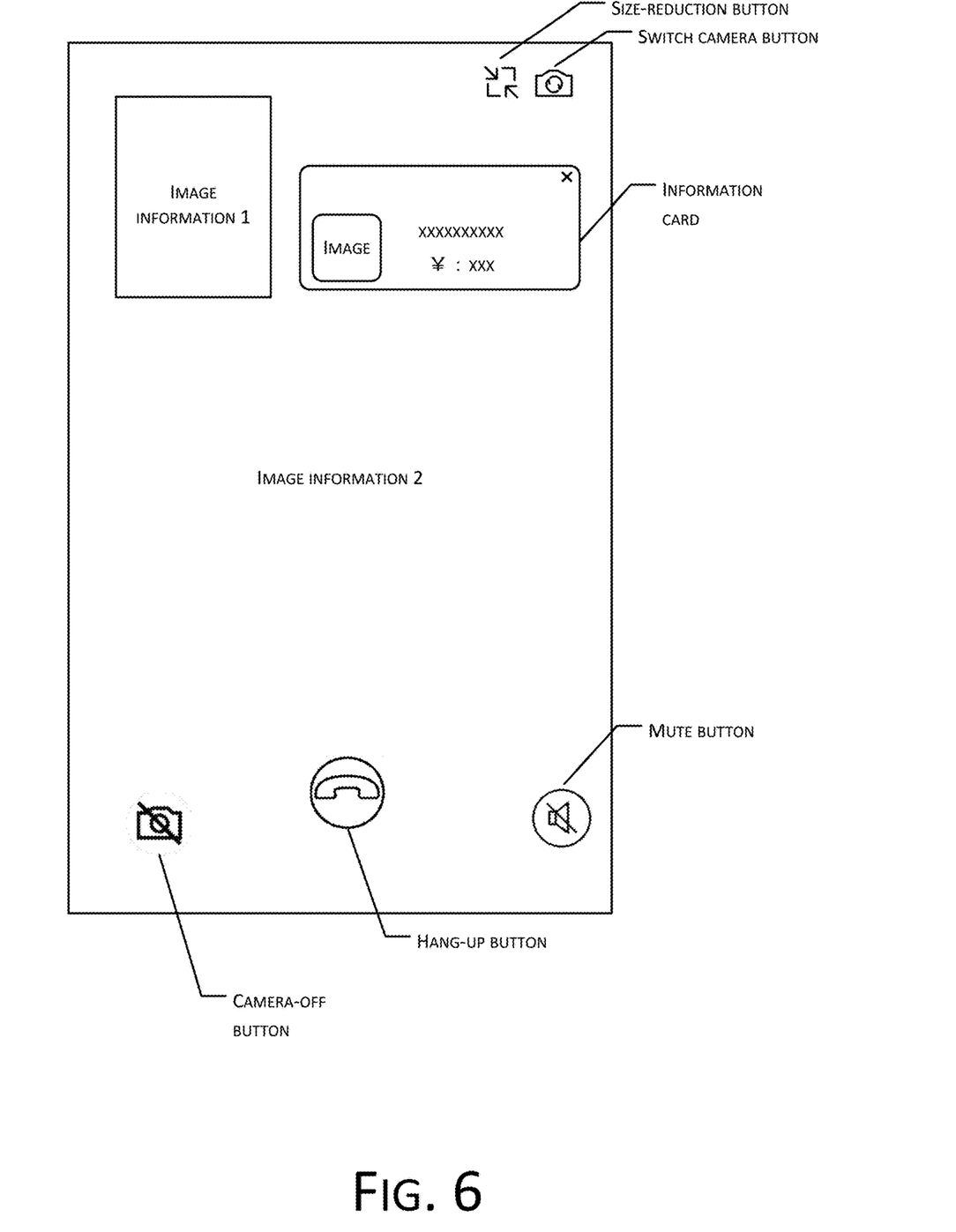
FIG. 6 is a second schematic diagram of an information card provided by the present disclosure.

For example, after the user B adjusts the size and position of the information card in FIG. 5, the information card in FIG. 5 can be the one as shown in FIG. 6.

It should be noted that obstructing the main part of the image information of the second user (e.g., the face) can be avoided by adjusting the size and/or position of the information card by the user. In addition, when the user adjusts the information card to a full-screen display, this facilitates the user to view the content of the information card. Finally, the user can avoid being disturbed by directly closing the information card.

It should be noted that, after the information card is displayed on the audio/video call interface of the instant communication client, a jump to a target page may be performed, or the target page may be presented in the information card according to a first click operation instruction when the first click operation instruction for the information card is received. Afterwards, the audio/video call interface can also be switched to a floating window mode, so that the first user and the second user can further continue the audio and video chat, thereby achieving the purpose of browsing page information of the target page while chatting. Apparently, after switching the audio/video call interface to the floating window mode, a second click operation instruction for the audio/video call interface of the floating window mode may also be received. According to the second click operation instruction, the audio/video call interface of the floating window mode is switched to a normal mode.

Given a product link address as an example of the message content of the instant communication message, when receiving a click instruction for the information card, a jump to a product display page corresponding to the product link address is made, or the content of the information card is directly updated into the product display page. The product display page displays information related to the product link address such as a product image, a product title, and a product price of a product. Afterwards, the audio/video call interface can also be switched to the floating window mode, so that the first user and the second user can also continue the audio and video chat, thereby achieving the purpose of purchasing products while chatting.

As shown in FIG. 5 or FIG. 6, if the user B wants to view the product, the user can click on the information card to jump to the product display page of the product XX, or the product display page of the product XX is presented in the information card.

In the present disclosure, in order to enable the second user of the other instant communication client to simultaneously view an operation of the first user of the instant communication client on the information card (e.g., a resizing and/or location operation, a deletion operation, and a click operation as described above), the information card can be synchronously displayed in the audio/video call interface of the other instant communication client, which is also called a synchronously displayed information card. The synchronously displayed information card may be generated by the other instant communication client according to the message content of the instant communication message, and details of the process of generation is similar to the process in which the instant communication client generates the information card according to the message content of the instant communication message, and are not repeatedly described herein. In addition, the size and location of the synchronously displayed information card can be determined based on an initial size (e.g., a size ratio between an information card and image information as 2:1:5) and an initial position (a directly below position) that are pre-negotiated with the instant communication client.

Figure 7:
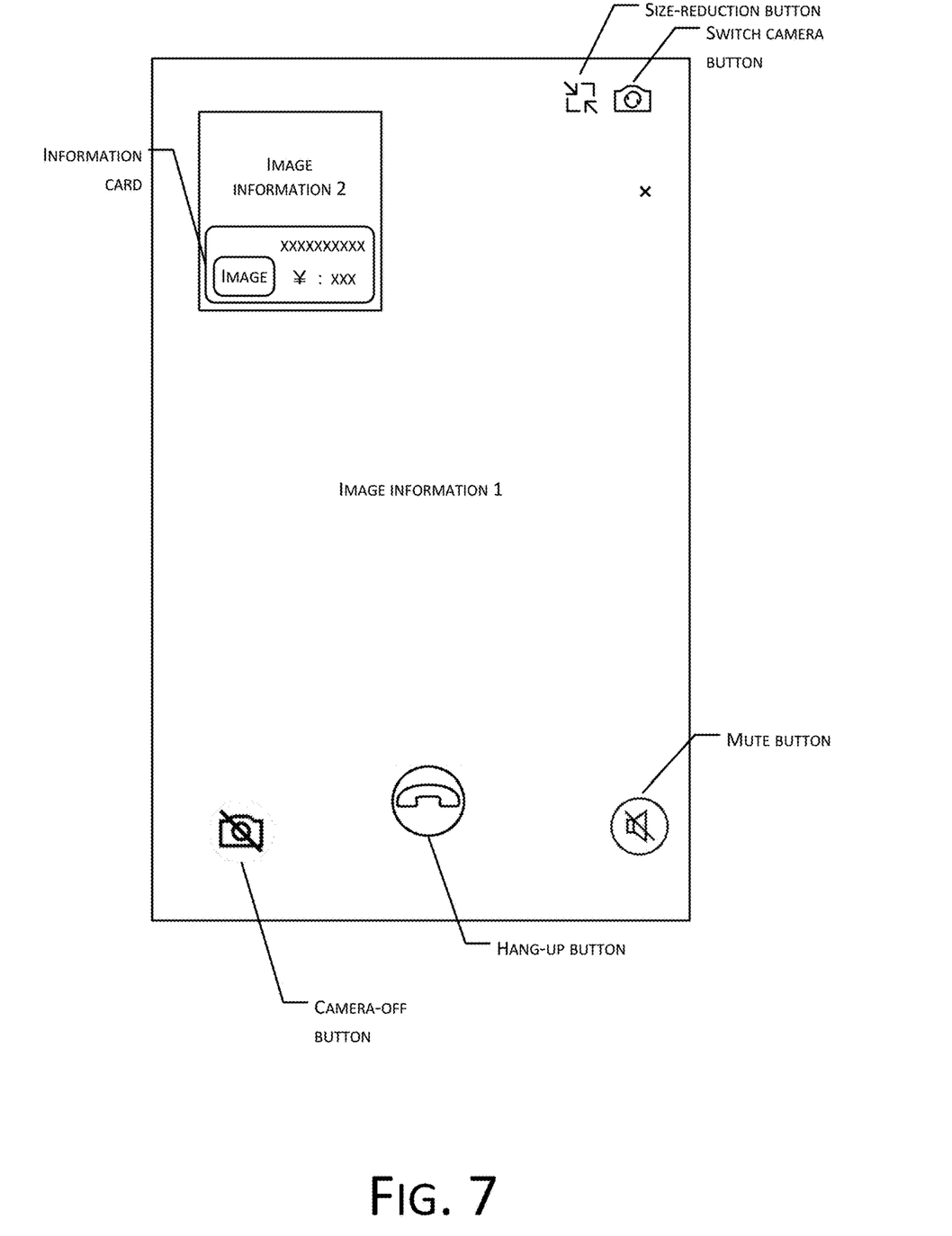
FIG. 7 is a first schematic diagram of synchronously displayed information cards provided by the present disclosure.

As in the foregoing example, after the user A sends the product link address of the product XX to the user B through the instant communication client 102, the video calling interface of the instant communication client 102 of the user A can display the information card as shown in FIG. 7. The information card in FIG. 7 is a synchronously displayed information card which can be displayed on the top of the image information 2 in a floating manner, and its size and position with respect to the image information 2 correspond to the size and position of the information card in FIG. 5 with respect to the image information 2. For example, in FIGS. 5 and 7, the size ratio of the information card with respect to the image information 2 is 1:5, and display positions are all directly below positions.

Apparently, in practical applications, the synchronously displayed information card may also be hidden, which is not limited by the present disclosure.

It should be noted that, since the information card in FIG. 7 is a synchronously displayed information card, a synchronization request can be sent to the instant communication client 102 when the user B of the instant communication client 104 performs an operation on the information card (for example, a resizing and/or position operation, a deletion operation and a click operation as described above). The synchronization request can be used to instruct the instant communication client 102 to perform a corresponding operation on the synchronized information card.

Figure 8:
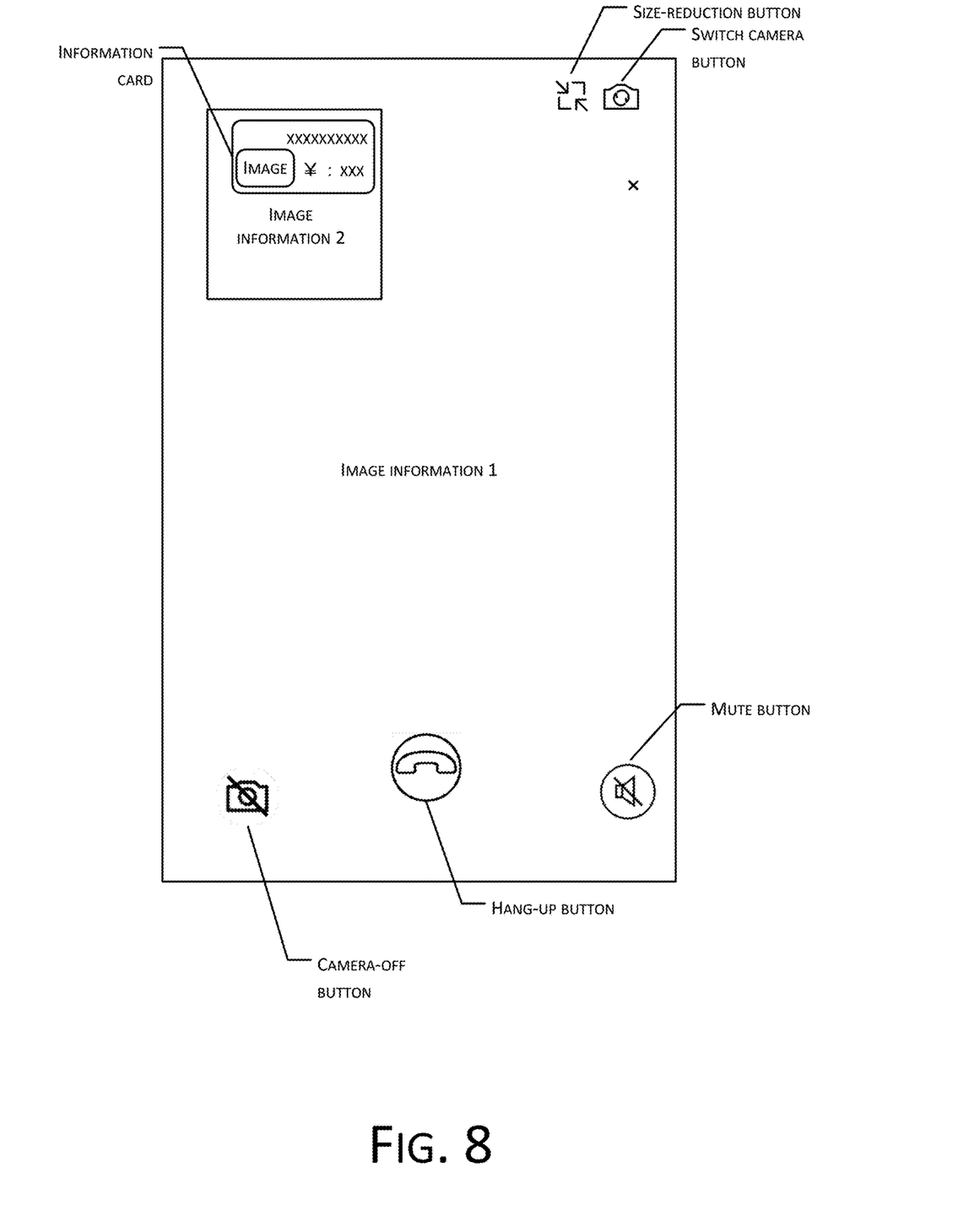
FIG. 8 is a second schematic diagram of synchronously displayed information cards provided by the present disclosure.

As in the foregoing example, when the information card shown in FIG. 5 is adjusted to the one shown in FIG. 6, the instant communication client 104 adjusts the synchronously displayed information card in FIG. 7 to the one shown in FIG. 8 according to the synchronization request.

It can be understood that the instant communication client 104 can send the synchronization request to the instant communication client 102 according to a pre-negotiated protocol specification, so that the instant communication client 102 can identify the synchronization request and execute a corresponding operation according to the synchronization request.

In the present disclosure, by synchronously displaying an information card in the instant communication client 102 and synchronously performing a corresponding operation on the synchronously displayed information card, communications between the user A and the user B can be made more synchronized, thereby improving the user experience.

As can be seen, in the present disclosure, by displaying an information card in an audio/video call interface, a user can immediately know that a new instant communication message is received. In addition, by operating the information card, the user can conveniently view information related to message content of the instant communication message. This thereby avoids the problems of poor user experience and cumbersome operations in the conventional technologies that are caused by the needs of first switching an audio/video call interface to a small display and then viewing a newly received instant communication message in a session interface if a user wants to view the instant communication message when a current interface of an instant communication client is the audio/video call interface.

Figure 9:
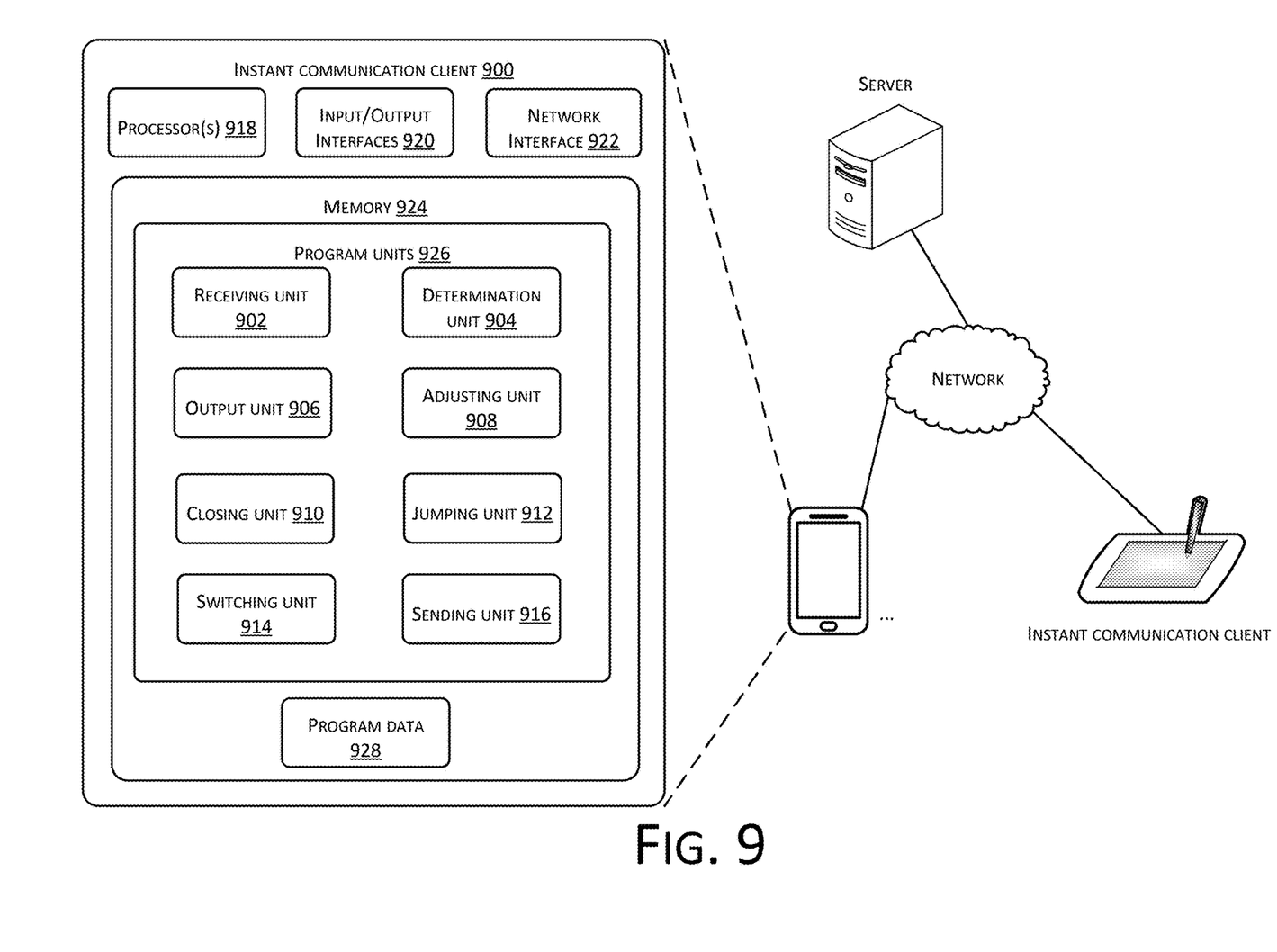
FIG. 9 is a schematic diagram of an instant communication client according to an embodiment of the present disclosure.

Corresponding to the foregoing method for prompting instant communication message, the embodiments of the present disclosure further provide an instant communication client. As shown in FIG. 9, an instant communication client 900 includes the following units.

A receiving unit 902 is configured to receive an instant communication message sent from another instant communication client, a current interface of the instant communication client being an audio/video call interface.

A determination unit 904 is configured to determine whether the instant communication message received by the receiving unit 902 satisfies a preset prompt condition.

The determination unit 904 may be specifically configured to:

determine whether the instant communication message is a message of a session to which the audio/video call interface belongs.

An output unit 906 is configured to output prompt information in the audio/video call interface through a preset prompting mode if the determination unit 904 determines that the instant communication message satisfies the preset prompt condition.

The preset prompting mode may include: a voice prompt, a vibration prompt, a message prompt box prompt, or a display information card prompt.

Optionally, the output unit 906 may specifically be configured to:

generate an information card according to message content of the instant communication message, the information card being associated with a target page, and the target page being used for displaying information related to the message content of the instant communication message; and display the information card in the audio/video call interface.

When the message content of the instant communication message is a product link address, generating the information card according to the message content of the instant communication message may include:

extracting identification information of a product from the product link address;

obtaining detailed information of the product from a server according to the identification information; and generating the information card based on the detailed information.

Optionally, the audio/video call interface includes image information of a first user of the instant communication client and image information of a second user of the other instant communication client.

Displaying the information card in the audio/video call interface includes:

displaying the information card on the image information of the second user in a floating manner.

Optionally, the client 900 may further include: an adjusting unit 908 and/or a closing unit 910.

The receiving unit 902 is further configured to receive an adjustment instruction for the information card inputted by the user.

The adjusting unit 908 is configured to adjust a size and/or a position of the information card according to the adjustment instruction received by the receiving unit 902.

Additionally or alternatively, the receiving unit 902 is further configured to receive a closing instruction for the information card inputted by the user.

The closing unit 910 is configured to close the information card according to the closing instruction received by the receiving unit 902.

Optionally, the client 900 may further include: a jumping unit 912.

The receiving unit 902 is further configured to receive a first click operation instruction for the information card.

The jumping unit 912 is configured to perform a jump to a target page or present the target page in the information card according to the first click operation instruction received by the receiving unit 902.

Optionally, the client 900 may further include:

a switching unit 914 configured to switch the audio/video call interface to a floating window mode.

Optionally, the receiving unit 902 is further configured to receive a second click operation instruction for the audio/video call interface in the floating window mode.

The switching unit 914 is further configured to switch the audio/video call interface in the floating window mode to a normal mode according to the second click operation instruction received by the receiving unit 902.

Optionally, the client 900 may further include:

a sending unit 916 configured to send a synchronization request to the other instant communication client, wherein the other instant communication client includes the information card that is synchronously displayed, and the synchronization request is used to instruct the other instant communication client to adjust a size and/or a position of the information card that is synchronously displayed, and/or the synchronization request is used to instruct the other instant communication client to close the information card that is synchronously displayed, and/or the synchronization request is used to instruct the other instant communication client to present the target page in the information card that is synchronously displayed.

In implementations, the client 900 may further include one or more processors 918, an input/output (I/O) interface 920, a network interface 922, and memory 924.

The memory 924 may include a form of computer readable media such as a volatile memory, a random access memory (RAM) and/or a non-volatile memory, for example, a read-only memory (ROM) or a flash RAM. The memory 924 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 924 may include program units 926 and program data 928. The program units 926 may include one or more of the units as described in the foregoing description and shown in FIG. 9.

Functions of functional modules of the apparatuses in the embodiments of the present disclosure can be implemented by the steps of the foregoing method embodiments. Therefore, details of a working process of the apparatuses provided by the present disclosure are not repeatedly described herein.

In the instant communication client provided by the present disclosure, the receiving unit 902 receives an instant communication message. The determination unit 904 determines whether the received instant communication message satisfies a preset prompt condition. If the instant communication message satisfies the preset prompt condition, the output unit 906 outputs prompt information through a preset prompting mode on an audio/video call interface. Thus, the prompt information can be outputted to a user in time, thereby greatly improving the user experience.

One skilled in the art will appreciate that the functions described in the one or more foregoing examples in the present disclosure can be implemented in hardware, software, firmware, or any combination thereof. When implemented in software, the functions may be stored in a computer readable media or transmitted as one or more instructions or codes in a computer readable media.

The purposes, technical solutions and beneficial effects of the present disclosure have been further described in detail with reference to the specific embodiments. It should be understood that these are merely specific embodiments of the present disclosure, and are not intended to limit the scope of the protection of the present disclosure. Any modifications, equivalent substitutions, improvements, etc., which are made on the basis of the technical solutions of the present disclosure, should be included in the scope of protection of the present disclosure.

The present disclosure can be further understood using the following clauses.

Clause 1: A method for prompting an instant communication message, comprising: receiving, by an instant communication client, an instant communication message sent from another instant communication client, a current interface of the instant communication client being an audio/video call interface; determining whether the received instant communication message satisfies a preset prompt condition; and outputting prompt information in the audio/ video call interface through a preset prompting mode if the instant communication message satisfies the preset prompt condition.

Clause 2: The method of Clause 1, wherein the preset prompting mode comprises a voice prompt, a vibration prompt, a display message prompt box prompt or a display information card prompt.

Clause 3: The method of Clause 1, wherein outputting the prompt information in the audio/video call interface through the preset prompting mode comprises: generating an information card according to message content of the instant communication message, the information card being associated with a target page, and the target page being used for displaying information related to the message content of the instant communication message; and displaying the information card in the audio/video call interface.

Clause 4: The method of Clause 3, wherein the audio/video call interface comprises information of a first user of the instant communication client and image information of a second user of the other instant communication client, and displaying the information card in the audio/video call interface comprises displaying the information card on the image information of the second user in a floating manner.

Clause 5: The method of Clause 3, further comprising: receiving an adjustment instruction for the information card inputted by a user, and adjusting a size and/or a position of the information card according to the adjustment instruction; and/or receiving a closing instruction for the information card inputted by the user, and closing the information card according to the closing instruction.

Clause 6: The method of Clause 3, further comprising: receiving a first click operation instruction for the information card; and jumping to a target page or present the target page in the information card according to the first click operation instruction.

Clause 7: The method of Clause 6, further comprising: switching the audio/video call interface to a floating window mode.

Clause 8: The method of Clause 7, further comprising: receiving a second click operation instruction for the audio/video call interface in the floating window mode; and switching the audio/video call interface in the floating window mode to a normal mode according to the second click operation instruction.

Clause 9: The method of Clause 5 or 6, further comprising: sending a synchronization request to the other instant communication client, wherein the other instant communication client comprises the information card that is synchronously displayed, and the synchronization request is used to instruct the other instant communication client to adjust a size and/or a position of the information card that is synchronously displayed, and/or the synchronization request is used to instruct the other instant communication client to close the information card that is synchronously displayed, and/or the synchronization request is used to instruct the other instant communication client to present the target page in the information card that is synchronously displayed.

Clause 10: The method of Clause 1, wherein determining whether the received instant communication message satisfies the preset prompt condition comprises: determining whether the instant communication message belongs to a session to which the audio/video call interface belongs.

Clause 11: The method of Clause 3, wherein the message content of the instant communication message is a product link address, and generating the information card according to the message content of the instant communication message comprises: extracting identification information of a product from the product link address; obtaining detailed information of the product from a server according to the identification information; and generating the information card based on the detailed information.

Clause 12: An instant communication client comprising: a receiving unit configured to receive an instant communication message sent from another instant communication client, a current interface of the instant communication client being an audio/video call interface; a determination unit configured to determine whether the instant communication message received by the receiving unit satisfies a preset prompt condition; and an output unit configured to output prompt information in the audio/video call interface through a preset prompting mode if the determination unit determines that the instant communication message satisfies the preset prompt condition.

Clause 13: The instant communication client of Clause 12, wherein the output unit is specifically configured to: generate an information card according to message content of the instant communication message, the information card being associated with a target page, and the target page being used for displaying information related to the message content of the instant communication message; and display the information card in the audio/video call interface.

Clause 14: The instant communication client of Clause 13, wherein the receiving unit is further configured to receive an adjustment instruction for the information card inputted by a user, and the instant communication client further comprises an adjusting unit configured to adjust a size and/or a position of the information card according to the adjustment instruction received by the receiving unit; and/or wherein the receiving unit is further configured to receive a closing instruction for the information card inputted by the user, and the instant communication client further comprises a closing unit configured to close the information card according to the closing instruction received by the receiving unit.

Clause 15: The instant communication client of Clause 13, wherein the receiving unit is further configured to receive a first click operation instruction for the information card, and the instant communication client further comprises a jumping unit configured to perform a jump to a target page or present the target page in the information card according to the first click operation instruction received by the receiving unit.

What is claimed is:

1. A method implemented by a first instant communication client running on a computing device, the method comprising:
   establishing a session corresponding to a call connection with a second instant communication client, the session including a session identifier;
   establishing an audio/video call interface of the call connection, the audio/video call interface belonging to the session;
   receiving an instant communication message, sent from the second instant communication client, the instant communication message including the session identifier;
   determining that the received instant communication message and the audio/video call interface belong to the same session according to the session identifier;
   outputting prompt information in the audio/video call interface through a preset prompting mode, the outputting the prompt information in the audio/video call interface through the preset prompting mode comprising:

generating an information card according to message content of the instant communication message, the information card including a link to a target page; and displaying the information card in the audio/video call interface;

displaying the target page within the information card in response to receiving an instruction to click the link; and switching the audio/video call interface to a floating window mode.

2. The method of claim 1, wherein the preset prompting mode comprises a voice prompt, a vibration prompt, a display message prompt box prompt or a display information card prompt.

3. The method of claim 1, wherein the target page is used for displaying information related to the message content of the instant communication message.

4. The method of claim 3, wherein the audio/video call interface comprises information of a first user of the first instant communication client and image information of a second user of the second instant communication client, and displaying the information card in the audio/video call interface comprises displaying the information card on the image information of the second user in a floating manner.

5. The method of claim 3, further comprising one or more of:

receiving an adjustment instruction for the information card inputted by a user, and adjusting one or more of a size and/or a position of the information card according to the adjustment instruction; and/or receiving a closing instruction for the information card inputted by the user, and closing the information card according to the closing instruction.

6. The method of claim 3, further comprising:
receiving a click operation instruction for the information card; and
jumping to the target page.

7. The method of claim 6, further comprising:
receiving a second click operation instruction for the audio/video call interface in the floating window mode; and
switching the audio/video call interface in the floating window mode to a normal mode according to the second click operation instruction.

8. The method of claim 3, further comprising:
sending a synchronization request to the second instant communication client, wherein the second instant communication client comprises the information card that is synchronously displayed, and the synchronization request is used to instruct the second instant communication client to adjust one or more of a size and/or a position of the information card that is synchronously displayed, and/or the synchronization request is used to instruct the second instant communication client to close the information card that is synchronously displayed, and/or the synchronization request is used to instruct the second instant communication client to present the target page in the information card that is synchronously displayed.

9. The method of claim 3, wherein the message content of the instant communication message is a product link address, and generating the information card according to the message content of the instant communication message comprises:
extracting identification information of a product from the product link address;
obtaining detailed information of the product from a server according to the identification information; and generating the information card based on the detailed information.

10. The method of claim 1, wherein the determining that the received instant communication message and the audio/video call interface belong to the same session according to the session identifier comprises:
determining that the instant communication message belongs to the session to which the audio/video call interface belongs according to the session identifier.

11. A first instant communication client comprising:
one or more processors; and
one or more computer readable media storing executable instructions that, when executed by the one or more processors, cause the one or more processors to perform acts comprising:
establishing a session corresponding to a call connection with a second instant communication client, the session including a session identifier;
establishing an audio/video call interface of the call connection, the audio/video call interface belonging to the session;
receiving an instant communication message, sent from the second instant communication client, the instant communication message including a session identifier;
determining that the instant communication message and the audio/video call interface belong to the same session according to the session identifier; and
outputting prompt information in the audio/video call interface through a preset prompting mode, the outputting the prompt information in the audio/video call interface through the preset prompting mode comprising:
generating an information card according to message content of the instant communication message, the information card including a link to a target page; and
displaying the information card in the audio/video call interface;
displaying the target page within the information card in response to receiving an instruction to click the link; and
switching the audio/video call interface to a floating window mode.

12. The first instant communication client of claim 11, wherein the target page is used for displaying information related to the message content of the instant communication message.

13. The first instant communication client of claim 12, wherein the acts further comprise:
receiving an adjustment instruction for the information card inputted by a user; and
adjusting one or more of a size and/or a position of the information card according to the adjustment instruction received by the receiving unit.

14. The first instant communication client of claim 12, wherein the acts further comprise:
receiving a closing instruction for the information card inputted by a user; and
closing the information card according to the closing instruction received by the receiving unit.

15. The first instant communication client of claim 12, wherein acts further comprise:
receiving a click operation instruction for the information card; and
jumping to the target page.

16. One or more computer readable media storing executable instructions that, when executed by one or more processors of a first instant communication client, cause the one or more processors to perform acts comprising:

establishing a session corresponding to a call connection with a second instant communication client, the session including a session identifier;

establishing an audio/video call interface of the call connection, the audio/video call interface belonging to the session;

receiving an instant communication message, sent from the second instant communication client, the instant communication message including the session identifier;

determining that the received instant communication message and the audio/video call interface belong to the same session according to the session identifier;

outputting prompt information in the audio/video call interface through a preset prompting mode;

displaying a target page within an information card in response to receiving a response to the prompt information; and switching the audio/video call interface to a floating window mode.

17. The one or more computer readable media of claim 16, wherein the outputting the prompt information in the audio/video call interface through the preset prompting mode comprises:

generating the information card according to message content of the instant communication message, the information card being associated with the target page, and the target page being used for displaying information related to the message content of the instant communication message; and displaying the information card in the audio/video call interface.

18. The one or more computer readable media of claim 17, wherein the audio/video call interface comprises information of a first user of the instant communication client and image information of a second user of the second instant communication client, and displaying the information card in the audio/video call interface comprises displaying the information card on the image information of the second user in a floating manner.

19. The one or more computer readable media of claim 17, the acts further comprising:

receiving an adjustment instruction for the information card inputted by a user, and adjusting one or more of a size and/or a position of the information card according to the adjustment instruction; and/or receiving a closing instruction for the information card inputted by the user, and closing the information card according to the closing instruction.

* * * * *